US010795568B2

(12) United States Patent
Park et al.

(10) Patent No.: US 10,795,568 B2
(45) Date of Patent: Oct. 6, 2020

(54) METHOD OF DISPLAYING MENU BASED ON DEPTH INFORMATION AND SPACE GESTURE OF USER

(71) Applicant: SAMSUNG ELECTRONICS CO., LTD., Suwon-si (KR)

(72) Inventors: Keun Joo Park, Seoul (KR); Hyun Surk Ryu, Hwaseong-si (KR); Chang Kyu Choi, Seongnam-si (KR); Joon Ah Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 15/966,286

(22) Filed: Apr. 30, 2018

(65) Prior Publication Data
US 2018/0253210 A1 Sep. 6, 2018

Related U.S. Application Data

(62) Division of application No. 14/168,049, filed on Jan. 30, 2014, now Pat. No. 9,983,779.

(30) Foreign Application Priority Data

Feb. 7, 2013 (KR) .......................... 10-2013-0014002
Nov. 29, 2013 (KR) .......................... 10-2013-0147534

(51) Int. Cl.
*G06F 3/0488* (2013.01)
*G06F 3/0482* (2013.01)
(Continued)

(52) U.S. Cl.
CPC ............ *G06F 3/0488* (2013.01); *G06F 3/017* (2013.01); *G06F 3/0304* (2013.01); *G06F 2203/04802* (2013.01)

(58) Field of Classification Search
CPC .......................... G06F 17/2705; G06F 3/04886
See application file for complete search history.

(56) References Cited

U.S. PATENT DOCUMENTS 7,728,269 B2 6/2010 Lichtsteiner et al.
2003/0169298 A1* 9/2003 Ording ................. G06F 3/0481
715/810
(Continued)

FOREIGN PATENT DOCUMENTS

JP 2012-155506 A 8/2012
KR 10-2009-0116591 A 11/2009
(Continued)

OTHER PUBLICATIONS

Communication dated Jun. 25, 2020 issued from the Korean Intellectual Property Office in Korean Application No. 10-2013-0147534.

*Primary Examiner* — Rayeez R Chowdhury
(74) *Attorney, Agent, or Firm* — Sughrue Mion, PLLC (57) ABSTRACT

A method of displaying a menu based on at least one of a depth information and a space gesture is provided. The method including determining depth information corresponding to a distance from a screen of a user terminal to a hand of a user; identifying at least one layer among a plurality of layers based on the depth information; and applying a graphic effect to the identified layer so that a menu page corresponding to the at least one identified layer is displayed on the screen of the user terminal.

15 Claims, 7 Drawing Sheets

(51) Int. Cl.
*G06F 3/01* (2006.01)
*G06F 3/03* (2006.01)

(56) References Cited

U.S. PATENT DOCUMENTS

| | | | |
|---|---|---|---|
| 2004/0100479 A1* | 5/2004 | Nakano | G06F 1/1626 715/700 |
| 2005/0246283 A1* | 11/2005 | Gwiazda | G06F 16/958 705/52 |
| 2006/0015812 A1 | 1/2006 | Cunningham et al. | |
| 2006/0051073 A1 | 3/2006 | Jung et al. | |
| 2006/0176305 A1* | 8/2006 | Arcas | G09G 5/39 345/428 |
| 2007/0152984 A1* | 7/2007 | Ording | G06F 3/04845 345/173 |
| 2009/0128498 A1* | 5/2009 | Hollemans | G06F 3/041 345/173 |
| 2010/0315417 A1* | 12/2010 | Cho | G06F 1/1643 345/419 |
| 2011/0234746 A1 | 9/2011 | Saleh et al. | |
| 2011/0256848 A1 | 10/2011 | Bok et al. | |
| 2012/0089947 A1 | 4/2012 | Lee et al. | |
| 2012/0169620 A1 | 7/2012 | Bowler, II | |
| 2012/0179998 A1 | 7/2012 | Nesladek et al. | |
| 2012/0210268 A1 | 8/2012 | Hilbrink et al. | |
| 2012/0268376 A1 | 10/2012 | Bi | |
| 2012/0293501 A1* | 11/2012 | Ishii | H04N 13/366 345/419 |
| 2013/0106831 A1* | 5/2013 | Lee | G06T 19/20 345/419 |

FOREIGN PATENT DOCUMENTS

| | | |
|---|---|---|
| KR | 10-2010-0130875 A | 12/2010 |
| KR | 1020110053660 A | 5/2011 |
| KR | 10-2011-0105671 A | 9/2011 |
| KR | 10-2012-0034302 A | 4/2012 |

* cited by examiner

METHOD OF DISPLAYING MENU BASED ON DEPTH INFORMATION AND SPACE GESTURE OF USER

CROSS-REFERENCE TO RELATED APPLICATIONS

This is a divisional application of U.S. patent application Ser. No. 14/168,049, filed Jan. 30, 2014, in the U.S. Patent and Trademark Office, which claims priority from Korean Patent Application No. 10-2013-0014002 filed on Feb. 7, 2013 in the Korean Intellectual Property Office and Korean Patent Application No. 10-2013-0147534 filed on Nov. 29, 2013 in the Korean Intellectual Property Office, the disclosures of which are incorporated herein by reference in its entireties.

BACKGROUND

1. Field

Methods and apparatuses consistent with exemplary embodiments relate to a method of displaying a menu based on depth information and a space gesture of a user.

2. Description of the Related Art

A two-dimensional (2D) display based on a touch interface may enable a user to execute a desired application by directly touching a menu icon arranged in the 2D display. That is, the user may deliver his or her intention to a device by touching a screen of the display. This method may achieve a high reliability user interface (UI).

However, because the user needs to directly touch a display of the device, when a hand of the user is, for example, wet or wearing a glove, or the display is remote from the user, the user may not be able to deliver his or her intention to the device. Furthermore, in the 2D display based on the touch interface, the user needs to touch a desired page to select a menu icon or needs to transfer to the page including the menu icon by changing pages by dragging.

SUMMARY

According to an aspect of an exemplary embodiment, there is provided a method of displaying a menu based on depth information, the method including measuring the depth information corresponding to a distance from a screen of a user terminal to a hand of a user, identifying at least one layer among a plurality of layers based on the depth information, and applying a graphic effect to the at least one layer of the plurality of layers so that a menu page corresponding to the at least one identified layer appears on the screen of the user terminal.

The method may further include detecting a transfer from a first layer to a second layer based on the depth information, wherein the applying of the graphic effect includes applying the graphic effect to at least the first layer such that a first menu page corresponding to the first layer gradually disappears while a second menu page corresponding to the second layer gradually appears.

The applying of the graphic effect may include increasing visibility of the second menu page corresponding to the second layer, and reducing visibility of the first menu page corresponding to the first layer.

The method may further include detecting a transfer from a first layer to a second layer based on the depth information, wherein the applying of the graphic effect includes comparing the distance from the screen to the hand of the user with a predetermined distance, and applying the graphic effect, using a result of the comparing to the second layer such that a menu page corresponding to the second layer appears over a menu page corresponding to the first layer in a discontinuous manner.

The determining the depth information may include measuring the depth information corresponding to the distance from the screen of the user terminal to the hand of the user using at least one dynamic vision sensor (DVS).

The measuring the depth information may include measuring the depth information corresponding to the distance from the screen of the user terminal to the hand of the user based on a difference between a first hand position in an image output from a first DVS and a second hand position in an image output from a second DVS.

The measuring of the depth information may include measuring the depth information of the hand of the user using at least one of a difference of positions of the hand measured by two image sensors, and using a time of flight (ToF) sensor.

The menu page corresponding to the plurality of layers may display the menu based on depth information including a two-dimensional (2D) screen.

The method may further include hierarchically displaying menu pages corresponding to the plurality of layers.

Any one of the menu pages corresponding to the plurality of layers includes at least one of icons corresponding to a plurality of applications, a plurality of emoticons, and a virtual keyboard.

According to an aspect of another exemplary embodiment, there is provided a method of displaying a menu based on a space gesture, the method including displaying at least one polyhedron including a plurality of surfaces, receiving a space gesture of a user for rotating the polyhedron, identifying a surface of the at least one polyhedron corresponding to the space gesture among the plurality of surfaces of the at least one polyhedron, and displaying a menu corresponding to the identified surface.

The identifying of the surface may include identifying the surface according to a rotational change of the space gesture, and the displaying of the menu may include displaying a second menu corresponding to a second surface of the polyhedron identified by a change in the space gesture, over the menu corresponding to the surface that was first identified and displayed.

The recognizing the space gesture of the user may include recognizing that the space gesture of the user is a predetermined motion for operation of another polyhedron disposed inside or outside of the polyhedron.

The identifying of the surface may include identifying a surface corresponding to a position of a pinch zoom motion among the plurality of surfaces included in the another polyhedron in response to the pinch zoom motion being the space gesture.

The recognizing of the space gesture of the user may include comparing a distance, from a screen to a hand of the user, with a predetermined distance, and recognizing that the space gesture of the user is for operation of another polyhedron disposed inside or outside of the at least one polyhedron based on a result of the comparing.

The method may further include hierarchically displaying the at least one polyhedron including the plurality of surfaces.

Any one of menus corresponding to the plurality of layers may include icons corresponding to a plurality of applications, another one of the menus includes a plurality of emoticons, or still another one of the menus includes a virtual keyboard. The recognizing the space gesture of the user may include recognizing the space gesture of the user for rotating the at least one polyhedron using at least one dynamic vision sensor (DVS).

The recognizing the space gesture of the user may include: recognizing the space gesture of the user for rotating the at least one polyhedron based on a coordinate difference between a first image output from a first DVS and a second image output from a second DVS, wherein the first image and the second image correspond to the space gesture performed in a predetermined space.

The recognizing of the space gesture of the user may include measuring a position, a transfer speed, and an angular velocity of the space gesture done with a hand of the user, and recognizing the space gesture of the user using a result of the measuring.

The menus corresponding to the plurality of surfaces of the at least one polyhedron may have similar properties to one another.

The menus corresponding to the plurality of surfaces of the at least one polyhedron may include a 2D screen.

Other features and aspects will be apparent from the following detailed description, the drawings, and the claims.

BRIEF DESCRIPTION OF THE DRAWINGS

The above and other aspects will be more apparent by describing certain exemplary embodiments with reference to the accompanying drawings, in which.

DETAILED DESCRIPTION OF EXEMPLARY EMBODIMENTS

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

Figure 1:
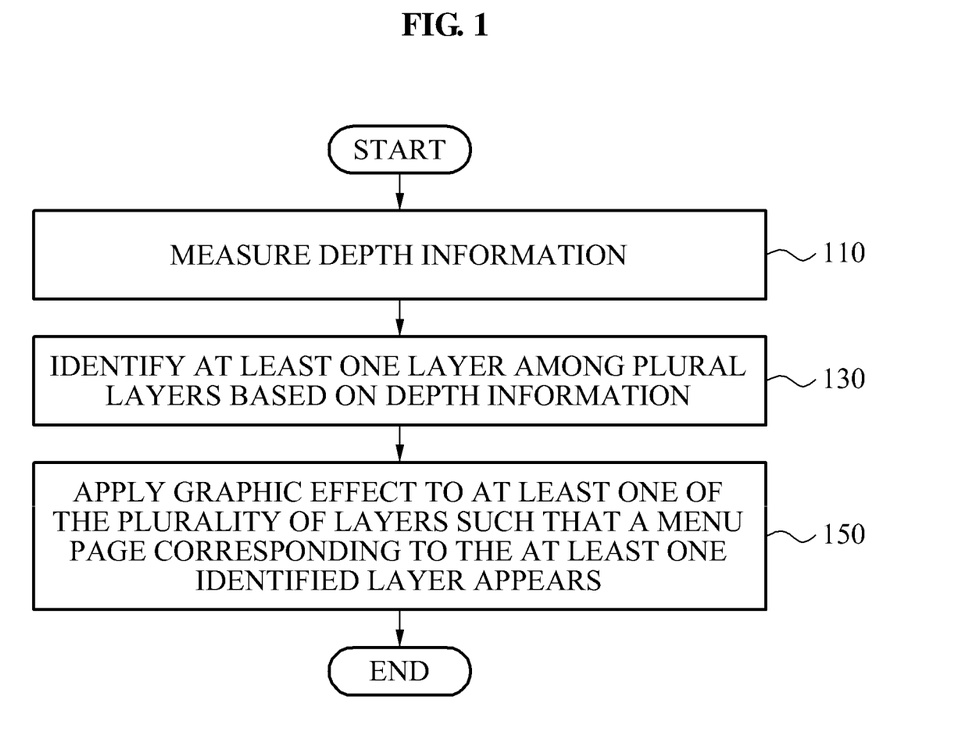
FIG. 1 is a flowchart illustrating a method of displaying a menu based on depth information, according to an exemplary embodiment.

FIG. 1 is a flowchart illustrating a method of displaying a menu based on depth information, according to an exemplary embodiment.

Referring to FIG. 1, a user terminal according to the exemplary embodiment may measure the depth information corresponding to a distance from a screen of the user terminal to a hand of the user in operation 110.

In operation 110, the user terminal may measure the depth information of the hand of the user, using a difference of positions of the hand, recognized on the screen of the user terminal, that is, within a predetermined distance from the screen of the user terminal using a plurality of image sensors, or using a time of flight (ToF) sensor. Here, the ToF sensor refers to a sensor that detects depth information of a target by instantly measuring a distance. Specifically, the sensor determines distance based on the speed of light and by measuring the time of flight of the light signal that is propagated between the sensor and the subject. According to one or more exemplary embodiments, the ToF sensor may be one of at least an RF-modulated light source with phase detector or a range gated imager.

In operation 130, the user terminal may identify at least one layer among a plurality of layers based on the depth information measured in operation 110. Here, the plurality of layers may be virtual layers which include different layers corresponding to the depth information.

In operation 150, the user terminal may apply a graphic effect to at least one layer of the plurality of layers such that a menu page corresponds to the at least one layer identified in operation 130 appears.

Any one of the menu pages corresponding to the plurality of layers may include icons corresponding to a plurality of applications. Another one of the menu pages may include a plurality of emoticons. Further, another menu page may include icons corresponding to digital content such as pictures, videos, documents, etc. Still another one of the menu pages may include a virtual keyboard. The virtual keyboard may be an input keyboard including Korean character keys, English character keys, numeric keys, special character keys, and the like.

The menu pages corresponding to the plurality of layers may be expressed as a 2D screen on the user terminal.

Figure 3:
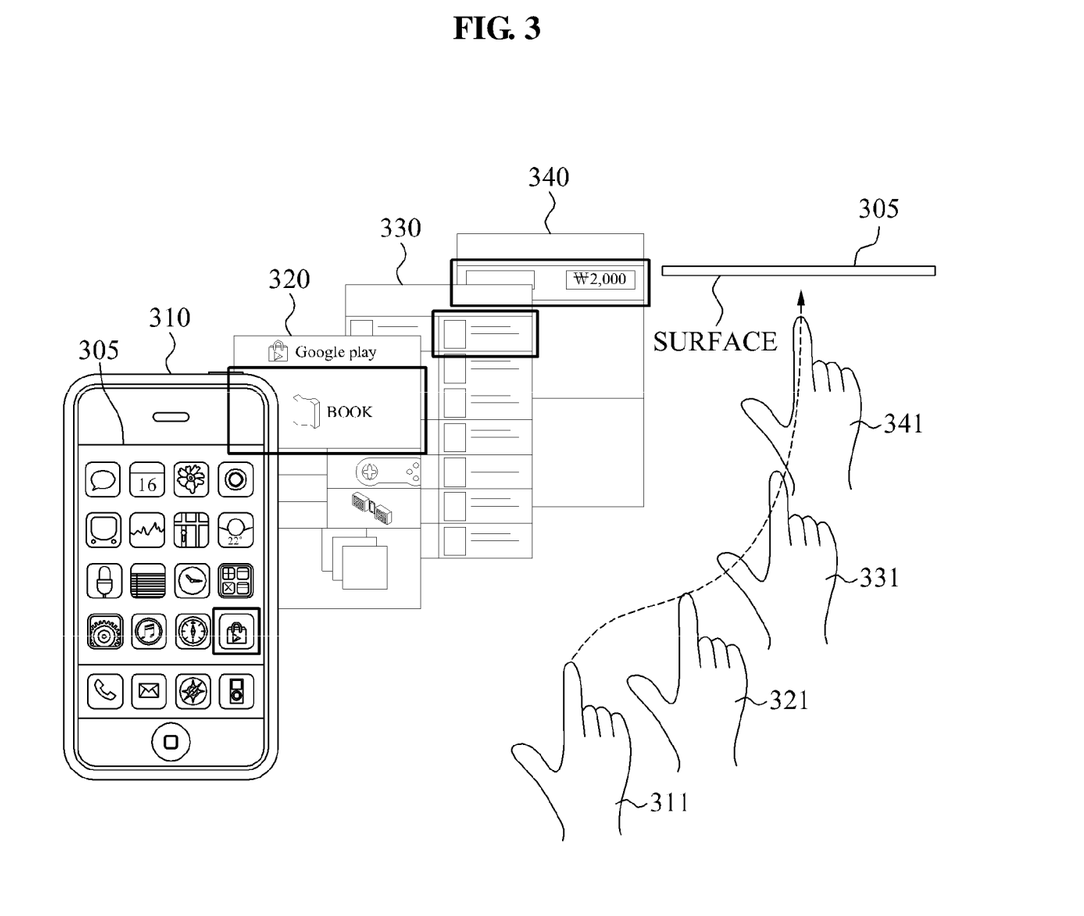
FIG. 3 is a diagram illustrating a screen of the user terminal displaying a menu page corresponding to at least one layer identified by a method similar to, for example, the method shown in FIG. 1, according to an exemplary embodiment.

For example, the user terminal may display all menu pages corresponding to the plurality of layers hierarchically as shown in the screen of FIG. 3.

Here, the user terminal may increase visibility of a menu page corresponding to the at least one layer identified in operation 130 while reducing visibility of a menu page corresponding to at least one remaining layer.

In addition, the user terminal may detect a transfer from a first layer to a second layer based on the depth information measured in operation 110. Here, the user terminal may apply the graphic effect to at least one layer of the plurality of layers such that a menu page corresponding to the first layer gradually disappears whereas a menu page corresponding to the second layer gradually appears.

According to an exemplary embodiment, the user terminal may compare a distance from the screen to the hand with a predetermined distance. The user terminal may then apply a graphic effect to at least one layer of the plurality of layers such that the menu page corresponding to the second layer appears from the menu page corresponding to the first layer in a discontinuous manner.

Figure 2:
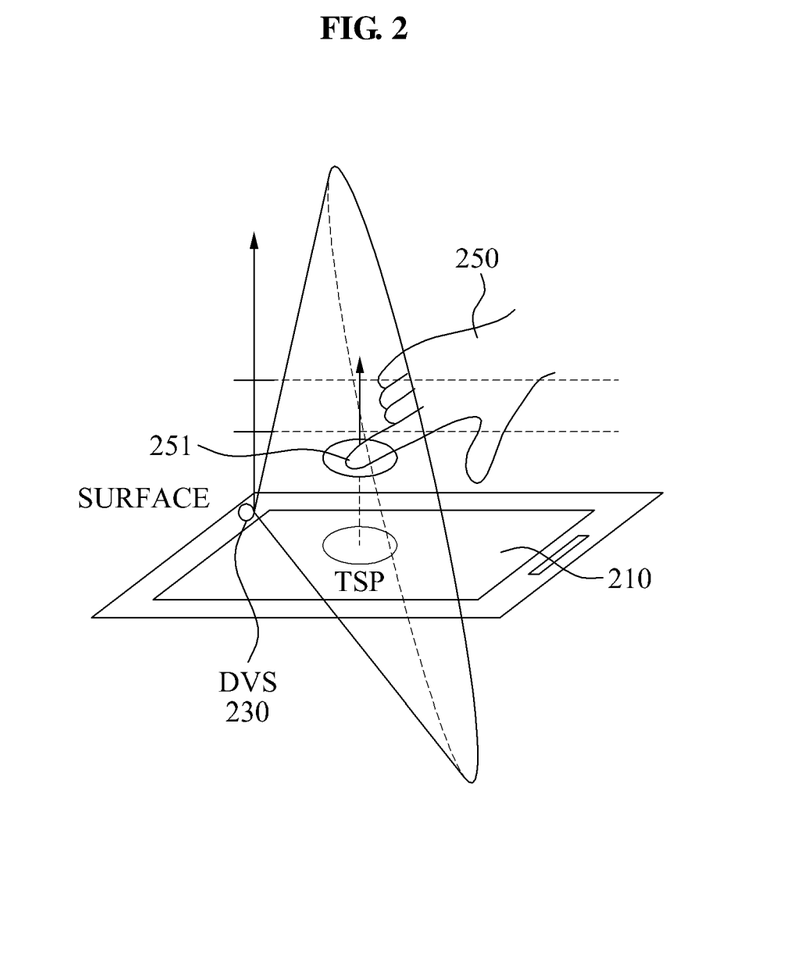
FIG. 2 is a diagram illustrating a configuration of a user terminal that measures depth information and a method of measuring depth information, according to an exemplary embodiment.

FIG. 2 is a diagram illustrating a configuration of a user terminal that measures depth information and a method of measuring the depth information, according to an exemplary embodiment. The measuring of depth information as shown in FIG. 2 may be done in accordance with the method of FIG. 1.

Referring to FIG. 2, the user terminal that executes the method of displaying the menu based on the depth information may include a touch sensor panel (TSP) 210 and a dynamic vision sensor (DVS) 230 for space recognition. Here, the TSP 210 may have high sensitivity capacitance.

The DVS 230 may be a sensor adapted to measure depth information corresponding to the distance from the screen of the user terminal to the hand of the user 250.

Therefore, in an exemplary embodiment, the depth information corresponds to the distance from the screen, for example the TSP 210, to the hand 250 or a finger tip 251 of the user may be measured by the DVS 230.

Besides the DVS 230, various other sensors, for example, an image sensor, a ToF sensor, an infrared (IR) sensor combined with an active IR light source, a glove type strain sensor, an acceleration sensor, a gyro sensor, and the like, may be used to measure the depth information.

In an exemplary embodiment, a finger may be detected by the DVS 230 in a non-contacting manner at a certain distance from the screen of the user terminal, for example, within a predetermined threshold distance. Next, the user terminal may identify a layer corresponding to the position, and select and display a menu page corresponding to the identified layer.

According to another exemplary embodiment, when two DVSs 230 are used, a difference may be generated in positions (x, y, z) of the hand between images output from the two DVSs 230. As a distance between the DVS 230 and the hand is shorter, the difference of positions may be increased, according to the binocular disparity principle by which two eyes of a person recognize a distance to an object. Therefore, the depth information to the hand may be measured using two DVSs 230 or other image sensors and using the binocular disparity principle. The ToF sensor includes a light source provided therein to scatter light onto an object and measure the light reflected from the object using a photo diode. As the distance between the sensor and the object is longer, time taken to detect the reflected light is increased. Using such a principle, the ToF sensor may recognize the depth information of the hand. Also, the depth information of the hand may be measured by recognizing a 3D locus, a velocity change, a symbol, and the like by measuring a transfer velocity (vx, vy, vz) and an angular velocity using other sensors such as an acceleration sensor and a gyro sensor.

FIG. 3 is a diagram illustrating the screen of the user terminal displaying the menu page corresponding to at least one layer identified by a method similar to, for example, the method shown in FIG. 1, according to an exemplary embodiment.

Referring to FIG. 3, a 3D space recognition user interface (UI) may be expressed on a 2D display, by applying the graphic effect to a corresponding layer so that the menu page corresponding to the identified layer appears based on the depth information.

For example, the user terminal may include a device such as a smart phone, a personal computer (PC), and a television (TV). The user terminal may measure or recognize the depth information corresponding to a motion of the hand of the user and the distance from the screen and/or display of the user terminal to the hand.

As described above, the 3D space recognition for recognizing a 3D space may be implemented by a passive optical image sensor, a ToF sensor, an active IR sensor combined with an active IR light source, a glove type strain sensor to be worn on the hand, an acceleration sensor, a gyro sensor, and the like, capable of recognizing a 3D space.

Therefore, when the user terminal recognizes the hand motion in a space or a distance between the display and the finger tip, the user terminal may provide a renovated 2D UI of a menu page appearing on a screen of the user terminal, by applying the graphic effect to at least one layer of a plurality of layers as shown in FIG. 3.

The user may transfer or select the menu pages on a 2D screen according to the depth information as if the menu pages corresponding to respective layers were present in the space. According to another exemplary embodiment, the user may, within a certain menu page corresponding to layer depth/distance from the screen, move laterally along a plane parallel to the screen surface. Such a movement would allow a user to select, at each menu depth, different options, controls, or content provided by that menu. Then, when the user again moves closer or farther from the display screen, thereby affecting the depth information, the next or previous menu layer associated may be displayed in accordance with both the parallel location point selected as well as the depth information.

The 'menu pages' corresponding to the respective layers may include concepts of not only different menu pages including the icons corresponding to the various applications but also a sub menu corresponding to a menu or icon selected from one menu page or contents included in the sub menu.

In addition, the 2D screen may be designed such that a desired menu page is transferred when the distance between the user terminal and the hand is reduced. That is, the user may consider a virtual menu page layer as present in the space and control the menu page displayed on the screen of the user terminal.

The user terminal may apply the graphic effect such that a menu page 310 corresponding to a first layer gradually disappears while a menu page 320 corresponding to a second layer gradually appears and becomes clear, as the distance between the hand of the user and a surface 305 of the display is reduced. Particularly, as the hand moves from a hand position 311 to a hand position 321 the menu page 310 may fade into the menu page 320.

For example, the respective layers may be expressed as a 3D image through the display of the user terminal in FIG. 3. The first layer may be disposed at an upper part and have a small 3D depth to be recognized by the user as being close. In a direction toward the second layer, a third layer, and a fourth layer, arranged heights of the menu pages corresponding to the layers may be reduced and have larger 3D depths to be recognized as far from the user with respect to the screen of the user terminal.

That is, the menu page 310 corresponding to the first layer, for example a main menu page, may be arranged at a top position. Subsequently, the 3D depth may be increased in order of the menu page 320 corresponding to the second layer, for example a main page of an e-BOOK icon selected from the main menu page, a menu page 330 corresponding to the third layer, for example a sub page or product page provided by an e-BOOK application selected from the main menu page, and a menu page 340 corresponding to the fourth layer, for example a payment page for a selected product.

Depending on embodiments, the user terminal may compare the distance from the screen to the hand of the user with the predetermined distance when detecting a transfer from the first layer to the second layer based on the depth information. For example, when the hand moves from a hand position 311 to a hand position 321. As a result of the comparison, when the distance from the screen to the hand is the predetermined distance, the user terminal may apply the graphic effect such that the menu page corresponding to the second layer appears from the menu page corresponding to the first layer discontinuously or suddenly. Similar transitions may be implemented as the hand moves from hand position 321, to hand position 331, which corresponds to the third layer and menu page 330. Thus, this may also be implemented when the hand moves from hand position 331 to hand position 341, which corresponds to the fourth layer and menu page 340. According to another exemplary embodiment, there may exist more than, or less than, the shown layers, menu pages, and hand positions.

In addition, according to an exemplary embodiment, when the hand of the user moves horizontally by a predetermined distance on a space separated from the screen of the user terminal, the user terminal may detect the transfer and display a next menu page by changing a current menu page to the next menu page.

Accordingly, a touch-based user UI, in which the user has to touch and drag pages one by one to select menus, may be avoided in part or in hole. Furthermore, intuitional interaction between the user and the user terminal may be achieved.

Moreover, the user terminal may display all the menu pages 310, 320, 330, and 340 corresponding to the plurality of layers on the screen transparently and hierarchically. In this case, the user terminal may increase visibility of a menu page, for example the menu page 310, corresponding to at least one identified layer among the plurality of layers, and reduce visibility of a menu page corresponding to at least one remaining layer, for example the layers 320, 330, and 340, thereby indicating that the menu page corresponding to the at least one identified layer, for example the first layer, is currently selected.

According to the embodiment of FIG. 3, layers of pages including menus are naturally moved in the space using the depth information. However, various applications expanded form this embodiment may be considered.

For example, the input keyboard, that is, the virtual keyboard, including character keys, numeric keys, special character keys, and the like used for the user to input characters may be implemented using a virtual space layer as aforementioned. Also, a group of various emoticons may be implemented using the virtual space layer.

That is, any one of the menu pages corresponding to the plurality of layers may include icons corresponding to a plurality of applications. Another one of the menu pages may include a plurality of emoticons. Still another one of the menu pages may include a virtual keyboard.

Thus, the UI is configured by displaying and transferring the menu pages by setting the virtual space layer according to the embodiment of FIG. 3. Hereinafter, a UI configured by a method of displaying menus using a polyhedron will be described.

Figure 4:
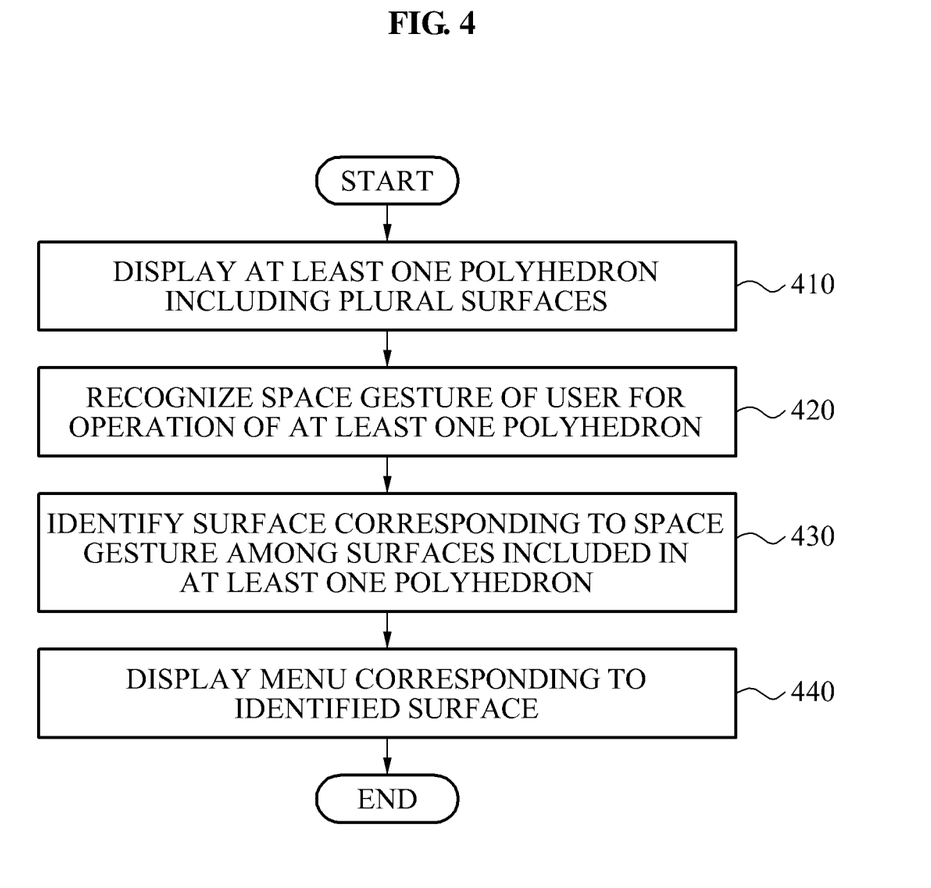
FIG. 4 is a flowchart illustrating a method of displaying a menu based on a space gesture of the user, according to an exemplary embodiment.

FIG. 4 is a flowchart illustrating a method of displaying a menu based on a space gesture of the user, according to an exemplary embodiment.

Referring to FIG. 4, in operation 410, a user terminal may display at least one polyhedron including a plurality of surfaces.

In operation 420, the user terminal may recognize a space gesture of a user for operation of the at least one polyhedron.

In operation 420, the user terminal may measure a position, a transfer velocity, and an angular velocity of the hand of the user, on the screen of the user terminal, and recognize the space gesture of the user using a result of the measurement. A method for the user terminal to recognize the space gesture will be described with reference to FIG. 6.

In operation 420, when the space gesture of the user is a predetermined motion, the user terminal may recognize the predetermined motion as the space gesture of the user for operation of another polyhedron disposed inside or outside at least one polyhedron. Here, the predetermined motion includes a pinch zoom motion, a motion of moving the hand leftward or rightward, or a motion of creating a fist and releasing the fist.

The 'pinch zoom motion' may refer to a motion including pinching a space by a thumb and an index or middle finger of the user, and adjusting an extent of the pinching motion.

The user terminal may recognize the space gesture in a different manner based on the result of comparing the distance from the screen to the hand with the predetermined distance. The method for the user terminal to recognize the space gesture in a different manner will be described with reference to FIG. 5.

In operation 430, the user terminal may identify a surface corresponding to the space gesture among the plurality of surfaces included in the at least one polyhedron.

The plurality of surfaces included in the at least one polyhedron may include different menus. For example, any one of the menus corresponding to the plurality of surfaces may include icons corresponding to a plurality of applications. Another one of the menus may include a plurality of emoticons. Still another one of the menus may include a virtual keyboard.

When the space gesture recognized in operation 420 is the pinch zoom motion, the user terminal may identify a surface of the at least one polyhedron corresponding to a position or size of the pinch zoom among the plurality of surfaces included in the at least one polyhedron, in operation 430. For example, the surface corresponding to the position of the pinch zoom may be a surface corresponding to a middle or a top portion of the position or size of a span between two fingers of the user formed in a predetermined space on the screen of the user terminal in the form of the pinch zoom.

In operation 440, the user terminal may display the menu corresponding to the surface identified in operation 430.

As the space gesture changes in operation 430, the user terminal may identify the surface corresponding to the changed space gesture. In this case, the user terminal may display the menus such that the menu corresponding to the second layer corresponding to the changed space gesture appears continuously from the menu corresponding to the first layer corresponding to the space gesture before the change.

The user terminal may display at least one menu polyhedron including a plurality of surfaces in a hierarchical manner. Here, menus corresponding to the plurality of surfaces may be expressed by a 2D screen.

Figure 5:
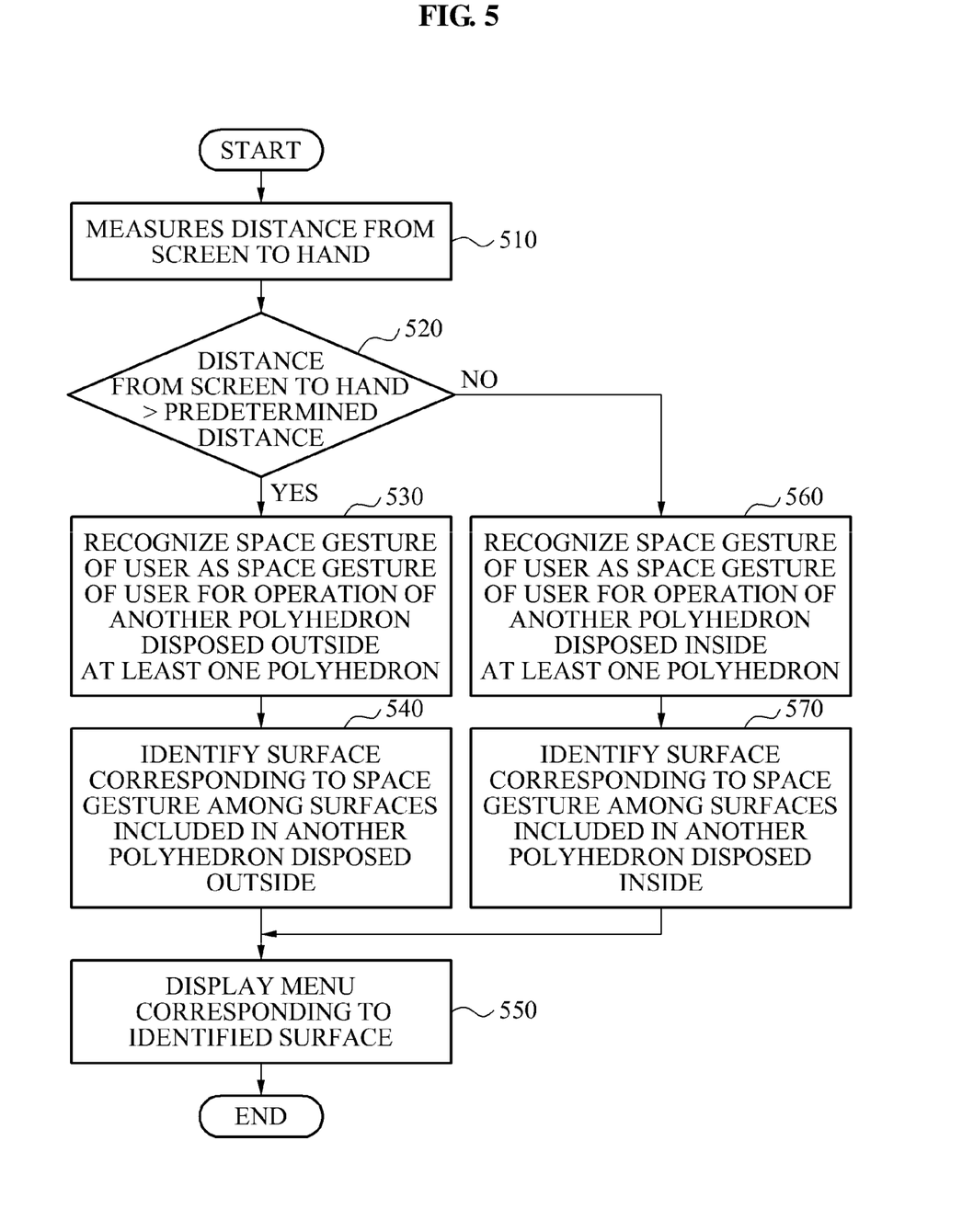
FIG. 5 is a flowchart illustrating a method of recognizing and processing a space gesture of the user differently according to a distance from the screen to a hand of the user, according to an exemplary embodiment.

FIG. 5 is a flowchart illustrating a method of recognizing and processing the space gesture of the user according to a distance from the screen to the hand of the user, according to an exemplary embodiment. According to another exemplary embodiment, the method illustrated in FIG. 5 is similar to steps 420 and 430 shown in the method of FIG. 4.

Referring to FIG. 5, in operation 510, the user terminal may measure the distance from the screen to the hand or measure depth information corresponding to the distance. The user terminal may compare the distance with a predetermined distance.

In operation 520, the user terminal may determine whether the distance from the screen to the hand is larger than the predetermined distance.

As a result of determination of operation 520, when the distance from the screen to the hand is larger than the predetermined distance, the user terminal may recognize the space gesture of the user as the space gesture for operation of the another polyhedron disposed outside at least one polyhedron in operation 530.

In operation 540, the user terminal may identify the surface corresponding to the space gesture among the plurality of surfaces included in the another polyhedron disposed outside the polyhedron.

Next, the user terminal may display the menu corresponding to the identified surface in operation 550.

Conversely, in operation 560, when the distance from the screen to the hand is smaller than the predetermined distance as a result of the determination of operation 520, the user terminal may recognize the space gesture of the user as the space gesture for operation of the another polyhedron disposed inside at least one polyhedron.

In this case, the user terminal may identify the surface corresponding to the space gesture among the plurality of surfaces included in the another polyhedron disposed inside at least one polyhedron in operation 570, and display the menu corresponding to the identified surface 550.

Figure 6:
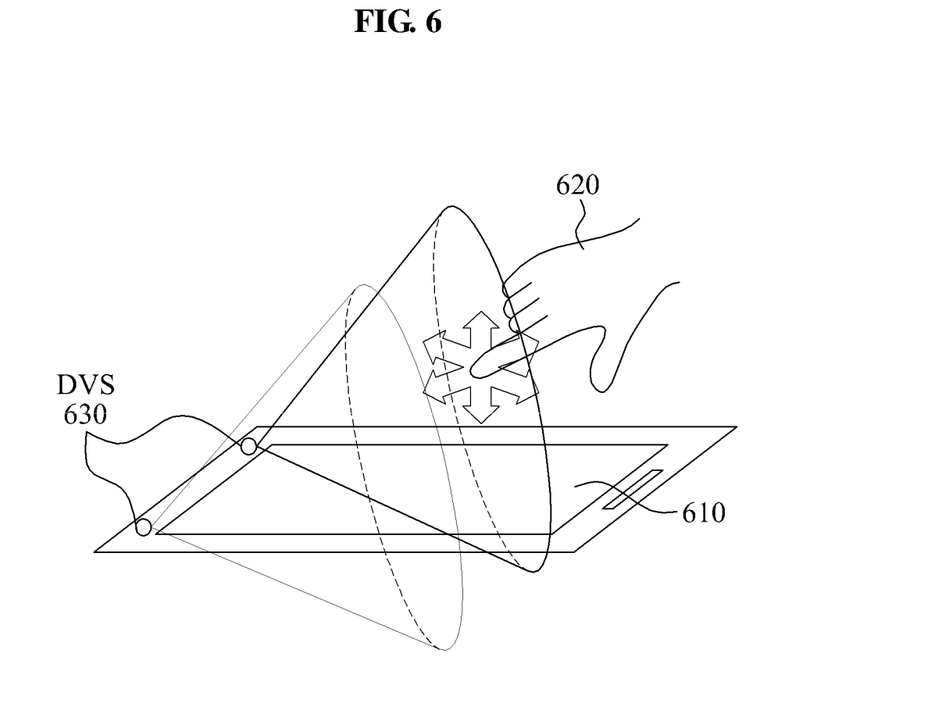
FIG. 6 is a diagram illustrating a configuration of a user terminal recognizing the space gesture of the user and a method of recognizing the space gesture by the user terminal, according to an exemplary embodiment.

FIG. 6 is a diagram illustrating a configuration of a user terminal recognizing the space gesture of the user and a method of recognizing the space gesture by the user terminal, according to an exemplary embodiment. According to another exemplary embodiment, the method of recognizing the space gesture of the user illustrated in FIG. 6 is similar to step 420 of the method of FIG. 4.

Referring to FIG. 6, the user terminal to execute the method of displaying the menu based on the space gesture of the user may include a TSP 610 and DVSs 630 for space recognition. Here, the TSP 610 may have high sensitivity capacitance.

Here, the DVSs 630 may be sensors adapted to recognize the space gesture of the user for operation of measuring depth information corresponding to a distance from a screen of the user terminal to a hand 620 of the user for operation of at least one polyhedron.

Specifically, according to an exemplary embodiment, the user terminal may recognize the space gesture of the user for operation of at least one polyhedron, using a coordinate difference that exists between an image output from a first DVS and an image output from a second DVS, with respect to the gesture of the user performed in a predetermined space.

According to an exemplary embodiment, the user terminal may measure a position (x, y, z) of the hand, a depth, a transfer velocity (vx, vy, vz), and an angular velocity on the screen of the user terminal, that is, the TSP 610, using sensors such as an acceleration sensor and a gyro sensor. In addition the user terminal may use the measurement result to recognize a 3D movement locus and a velocity change or recognize the space gesture of the user through symbol recognition. In the same manner, the user terminal may measure the depth information corresponding to the distance from the screen, that is, the TSP 610, to the hand or finger tip of the user, using the two DVSs, image sensors, or ToF sensors.

Figure 7:
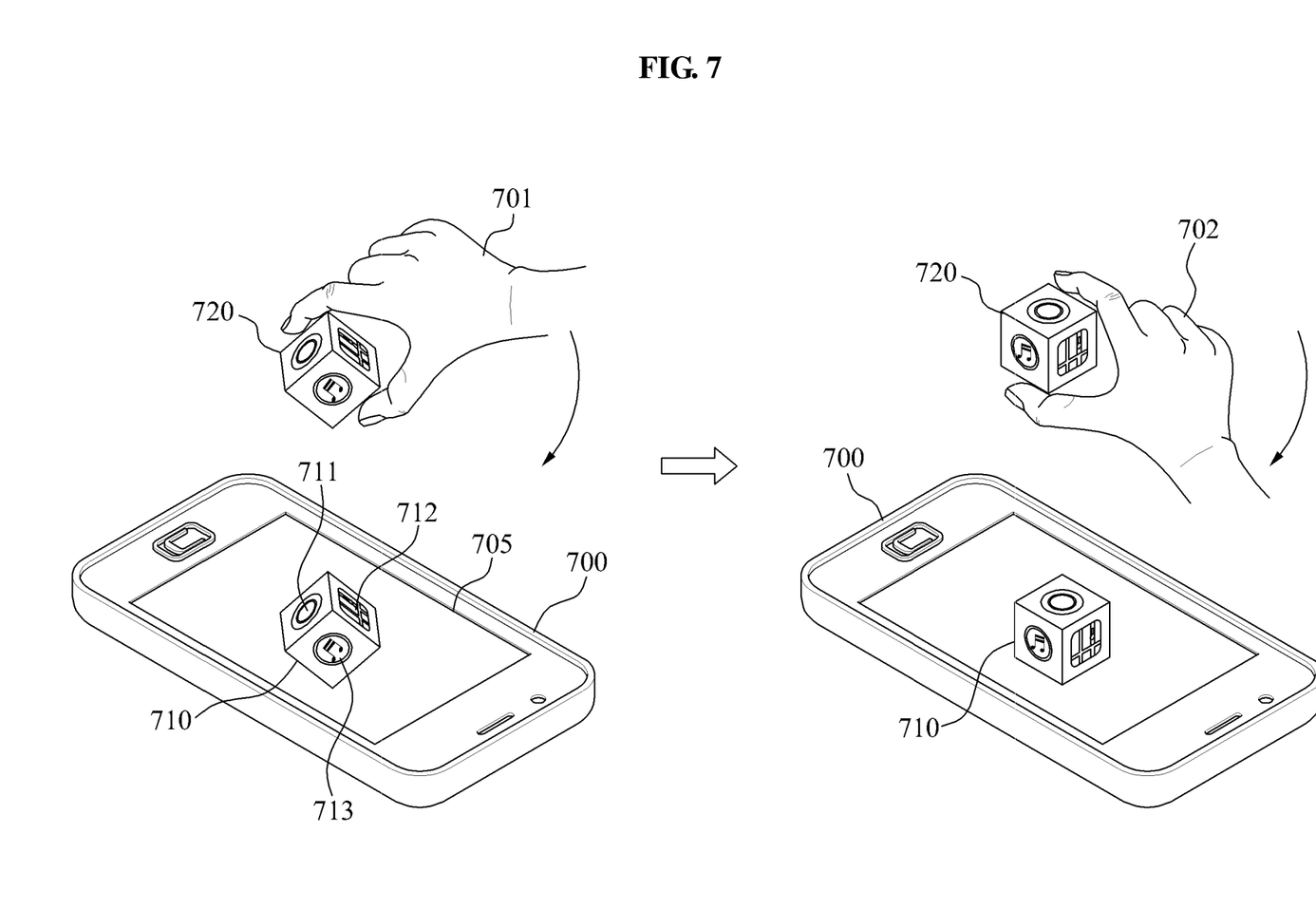
FIG. 7 is a diagram illustrating a screen of a user terminal displaying a menu corresponding to an identified surface among a plurality of surfaces included in at least one polyhedron, according to an exemplary embodiment.

FIG. 7 is a diagram illustrating a screen of a user terminal displaying a menu corresponding to an identified surface among a plurality of surfaces included in at least one polyhedron, according to an exemplary embodiment. According to another exemplary embodiment, the exemplary embodiment illustrated in FIG. 7 may be similar to the method of FIG. 4.

The user terminal may recognize a space gesture of a user performed in a predetermined space on the screen of the user terminal. Here, the space gesture may be used to operate the polyhedron 710 expressed as a 2D screen on the user terminal 700.

For example, the polyhedron 710 may be a hexahedral cube or other 3D shapes having more surfaces than a hexahedral cube. The plurality of surfaces of the polyhedron may display menus having similar properties.

For example, a cube 710 displaying different menus on different surfaces, for example a power management menu and surface 711, a map menu and surface 712, and a music menu and surface 713, may be displayed on the screen 705 of the user terminal 700. In this state, when the user makes a gesture of holding 701 and rotating 702 a virtual cube 720 in the predetermined space on the screen, the cube 710 displayed on the screen may be rotated together. When the user stops moving and maintains a predetermined time so that a desired surface comes to a top, the menu corresponding to the surface identified as a top surface of the virtual cube 720 may be displayed on the screen by the space gesture.

In addition, according to the exemplary embodiment, other cubes in different sizes may be present inside and outside one cube. Therefore, the user may select other cubes disposed inside or outside the cube by making the pinch zoom motion that separates a thumb and an index finger holding the virtual cube or gathers the thumb and the index finger from the separated state, and may select menus included in other cubes.

Furthermore, depending on embodiments, another cube or layer disposed inside or outside one cube may be selected using the distance from the screen to the hand or the depth information corresponding to the distance as shown in FIG. 5.

According to the exemplary embodiment, the user may select a desired menu without having to touch and drag pages one by one by the display method through the implementation and use of a 3D space UI in the 2D screen as described above.

In addition, according to the exemplary embodiment, intuitional interaction between the user and the user terminal may be achieved and natural user experience may be provided.

A number of exemplary embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of displaying a menu, the method comprising:
   displaying a first polyhedron comprising a plurality of first surfaces;
   recognizing a first space gesture of a user for operating the first polyhedron;
   identifying a first surface corresponding to the first space gesture among the plurality of first surfaces included in the first polyhedron;
   displaying a first menu corresponding to the identified first surface;
   receiving a second space gesture corresponding to a pinch zoom motion for operation of a second polyhedron disposed inside the displayed first polyhedron;
   identifying a second surface corresponding to a position of the pinch zoom motion among a second plurality of second surfaces of the second polyhedron; and
   displaying a second menu corresponding to the identified second surface.

2. The method of claim 1, wherein the identifying the first surface corresponding to the first space gesture comprises identifying the first surface according to a rotational change of the first space gesture, and
   wherein the displaying of the first menu corresponding to the identified first surface comprises displaying another menu, corresponding to another first surface of the first polyhedron identified by a change in the first space gesture, over the first menu corresponding to the first surface that was first identified and displayed.

3. The method of claim 1, wherein the plurality of first surfaces of the first polyhedron comprise menus different from one another.

4. The method of claim 3, wherein the recognizing the first space gesture of the user comprises:
   comparing a distance, from a screen to a hand of the user, with a predetermined distance; and
   recognizing that the first space gesture of the user is for operation of another polyhedron disposed inside or outside of the first polyhedron based on a result of the comparing.

5. The method of claim 1, further comprising:
   hierarchically displaying the first polyhedron comprising the plurality of first surfaces.

6. The method of claim 1, wherein at least a first one of a plurality of menus corresponding to at least one of the plurality of first surfaces comprises a plurality of icons that correspond to a plurality of applications,
   wherein a second one of the plurality of menus comprises a plurality of ennot icons, and
   wherein a third one of the plurality of menus comprises a virtual keyboard.

7. The method of claim 1, wherein the recognizing the first space gesture of the user comprises:
   recognizing the first space gesture of the user for operating the first polyhedron using at least one dynamic vision sensor (DVS).

8. The method of claim 7, wherein the recognizing the first space gesture of the user comprises:
   recognizing the first space gesture of the user for operating the first polyhedron based on a coordinate difference between a first image output from a first DVS and a second image output from a second DVS, and
   wherein the first image and the second image correspond to the first space gesture performed in a predetermined space.

9. The method of claim 1, wherein the recognizing the first space gesture of the user comprises:
   measuring a position, a transfer speed, and an angular velocity of the first space gesture done with a hand of the user; and
   recognizing the first space gesture of the user using a result of the measuring.

10. The method of claim 1, wherein a plurality of menus, corresponding to the plurality of first surfaces of the first polyhedron, have similar properties to one another.

11. The method of claim 1, wherein a plurality of menus corresponding to the plurality of first surfaces of the first polyhedron comprise a two-dimensional screen.

12. A method of displaying a menu, the method comprising:
   displaying a first polyhedron comprising a plurality of first surfaces;
   receiving, at a user terminal, a first space gesture for operating the first polyhedron;
   determining at least one property of the first space gesture, wherein the at least one property comprises at least one of a position and a size of the first space gesture;
   adjusting a graphic on a screen of the user terminal based on the at least one property of the first space gesture;
   determining a first menu associated with the first space gesture and displaying the first menu on the screen of the user terminal;
   receiving a second space gesture corresponding to a pinch zoom motion for operation of a second polyhedron disposed inside the displayed first polyhedron;
   identifying a second surface corresponding to a position of the pinch zoom motion among a second plurality of second surfaces of the second polyhedron; and
   displaying a second menu corresponding to the identified second surface.

13. The method of claim 12, wherein the determining the at least one property comprises:
   measuring depth information corresponding to a distance from the screen of the user terminal to a hand of a user using at least one of a difference of positions of the hand measured by two image sensors, and using a time of flight sensor;
   identifying a first layer among a plurality of layers based on the depth information; and
   detecting a transfer from the first layer to a second layer based on the depth information.

14. The method of claim 13, wherein the adjusting the graphic comprises:
   applying a graphic effect to the first layer so that a first menu page corresponding to the first layer appears on the screen of the user terminal;
   applying the graphic effect to at least the first layer such that the first menu page corresponding to the first layer gradually disappears while a second menu page corresponding to the second layer gradually appears;
   increasing visibility of the second menu page corresponding to the second layer;
   reducing visibility of the first menu page corresponding to the first layer; and
   applying the graphic effect to the second layer such that the second menu page corresponding to the second layer appears over the first menu page corresponding to the first layer in a discontinuous manner.

15. A user terminal comprising:
a processor configured to:
- control to display a first polyhedron comprising a first plurality of surfaces;
- receive a first space gesture;
- identify one of the first plurality of surfaces of the first polyhedron corresponding to a rotational change in the received first space gesture;
- control to display a first menu corresponding to the identified one of the first plurality of surfaces of the first polyhedron;
- receive a second space gesture corresponding to a pinch zoom motion for operation of a second polyhedron disposed inside the displayed first polyhedron;
- identify one of a second plurality of surfaces of the second polyhedron corresponding to a position of the pinch zoom motion corresponding to the received second space gesture; and
- control to display a second menu corresponding to the identified one of the second plurality of surfaces of the second polyhedron.

* * * * *